(12) United States Patent
Otto et al.

(10) Patent No.: US 7,869,922 B2
(45) Date of Patent: Jan. 11, 2011

(54) METHOD AND APPARATUS TO PUT A WINDROWER HEADER IN THE TRANSPORT MODE UNDER SPECIFIED CONDITIONS

(75) Inventors: Douglas R. Otto, Ephrata, PA (US);
Sean P. Kopp, Mount Joy, PA (US);
Robert L. Fackler, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 1218 days.

(21) Appl. No.: 11/484,476

(22) Filed: Jul. 11, 2006

(65) Prior Publication Data

US 2006/0248868 A1 Nov. 9, 2006

Related U.S. Application Data

(63) Continuation-in-part of application No. 10/822,465, filed on Apr. 12, 2004, now Pat. No. 7,168,226.

(60) Provisional application No. 60/699,271, filed on Jul. 14, 2005, provisional application No. 60/699,548, filed on Jul. 15, 2005.

(51) Int. Cl.
*A01D 41/14* (2006.01)
(52) U.S. Cl. .............. 701/50; 701/99; 56/314; 56/10.2 R; 56/208; 56/10.2 E
(58) Field of Classification Search .......... 701/50, 701/99; 56/10.2 E, 208, 314, 14.5
See application file for complete search history.

(56) References Cited

U.S. PATENT DOCUMENTS

| | | | |
|---|---|---|---|
| 3,603,066 A | 9/1971 | Burrough et al. | 56/208 |
| 4,335,561 A | 6/1982 | Swanson et al. | 56/10.2 |
| 4,523,886 A | 6/1985 | Reeves | 414/641 |
| 4,527,381 A | 7/1985 | Mann | 56/209 |
| 4,612,757 A | 9/1986 | Halls et al. | 56/10.2 |
| 4,622,803 A | 11/1986 | Lech | 56/10.2 |
| 4,676,053 A | 6/1987 | Pruitt | 56/208 |
| 4,733,523 A | 3/1988 | Dedeyne et al. | 56/209 |
| 5,359,836 A | 11/1994 | Zeuner et al. | 56/10.2 |
| 5,463,854 A | 11/1995 | Chmielewski, Jr. et al. | 56/10.2 E |
| 5,469,694 A | 11/1995 | Panousheck et al. | 56/10.2 E |
| 5,471,823 A | 12/1995 | Panoushek et al. | 56/10.2 E |
| 5,471,825 A | 12/1995 | Panoushek et al. | 56/10.2 E |
| 5,473,870 A | 12/1995 | Panoushek et al. | 56/10.2 E |
| 5,524,424 A | 6/1996 | Halgrimson et al. | 56/10.2 D |
| 5,577,373 A | 11/1996 | Panoushek et al. | 56/10.2 E |

(Continued)

*Primary Examiner*—Thomas G Black
*Assistant Examiner*—Wae Louie
(74) *Attorney, Agent, or Firm*—Patrick M. Sheldrake; Michael G. Harms

(57) ABSTRACT

A method and apparatus for automatically controlling a header lift system of an agricultural harvesting machine, particularly a windrower, to put a header of the machine into a transport mode wherein the header is raised to an elevated transport position, under certain specific conditions. Such conditions can include, but are not limited to, the machine operating in a high-speed range, the header not operating, the speed of the machine being above a predetermined level, and the last inputted control command being a header raise command. When in the transport mode, the lift system can also be operated in a float mode. Further, the header lift system can be returned to a normal mode when certain criteria are present for doing so.

27 Claims, 8 Drawing Sheets

U.S. PATENT DOCUMENTS

| | | | |
|---|---|---|---|
| 5,613,352 A * | 3/1997 | Panoushek et al. | 56/10.2 E |
| 5,633,452 A | 5/1997 | Bebernes | 73/37 |
| 5,704,200 A | 1/1998 | Chmielewski, Jr. et al. | 56/10.2 E |
| 5,778,644 A * | 7/1998 | Keller et al. | 56/11.2 |
| 5,906,089 A | 5/1999 | Guinn et al. | 56/10.2 |
| 5,964,077 A | 10/1999 | Guinn | 56/10.2 |
| 5,983,615 A * | 11/1999 | Schmid et al. | 56/208 |
| 6,086,509 A * | 7/2000 | Johnson et al. | 477/97 |
| 6,105,679 A * | 8/2000 | Schubert et al. | 172/4 |
| 6,119,442 A | 9/2000 | Hale | 56/10.2 H |
| 6,151,874 A * | 11/2000 | Eis | 56/10.2 E |
| 6,167,337 A | 12/2000 | Haack et al. | 701/50 |
| 6,292,729 B2 | 9/2001 | Falck et al. | 701/50 |
| 6,345,490 B1 | 2/2002 | Wolff | 56/15.2 |
| 6,449,553 B1 * | 9/2002 | Saur et al. | 701/93 |
| 6,591,591 B2 | 7/2003 | Coers et al. | 56/10.2 G |
| 6,616,398 B2 * | 9/2003 | Dershem et al. | 414/686 |
| 6,681,551 B1 | 1/2004 | Sheidler et al. | 56/10.2 G |
| 6,813,873 B2 | 11/2004 | Allwörden et al. | 56/10.2 E |
| 6,842,680 B2 * | 1/2005 | Doddek et al. | 701/50 |
| 6,865,870 B2 | 3/2005 | Heisey | 56/10.2 G |
| 6,871,483 B1 * | 3/2005 | Panoushek | 56/10.2 E |
| 6,901,729 B1 * | 6/2005 | Otto et al. | 56/208 |
| 7,058,495 B2 * | 6/2006 | Budde et al. | 701/50 |
| 7,133,758 B2 * | 11/2006 | Otto et al. | 701/50 |
| 7,159,687 B2 * | 1/2007 | Dunn et al. | 180/329 |
| 7,168,226 B2 * | 1/2007 | McLean et al. | 56/10.2 E |
| 7,168,229 B1 * | 1/2007 | Hoffman et al. | 56/208 |
| 7,306,062 B2 * | 12/2007 | Dunn | 180/6.48 |
| 7,430,846 B2 * | 10/2008 | Bomleny et al. | 56/10.2 E |
| 7,530,921 B2 * | 5/2009 | Fackler et al. | 477/96 |
| 7,555,883 B2 * | 7/2009 | Fackler et al. | 56/10.2 E |
| 7,588,118 B2 * | 9/2009 | Sawada | 180/302 |
| 7,603,837 B2 * | 10/2009 | Ehrhart et al. | 56/10.2 E |
| 7,669,392 B2 * | 3/2010 | Ehrhart | 56/10.2 E |
| 7,703,266 B2 * | 4/2010 | Fackler et al. | 56/10.2 E |
| 7,707,811 B1 * | 5/2010 | Strosser | 56/10.2 E |
| 2002/0178710 A1 | 12/2002 | Engelstad et al. | 56/10.2 E |
| 2003/0000193 A1 | 1/2003 | Beck et al. | 56/10.2 E |
| 2003/0140609 A1 | 7/2003 | Beaujot | 56/10.2 E |
| 2004/0040276 A1 | 3/2004 | Allworden et al. | 56/10.2 R |
| 2004/0050025 A1 | 3/2004 | Vandendriessche et al. | 56/10.2 R |
| 2004/0128966 A1 | 7/2004 | Kempf | 56/10.8 |
| 2006/0248868 A1 * | 11/2006 | Otto et al. | 56/10.2 E |
| 2009/0037072 A1 * | 2/2009 | Lin et al. | 701/99 |

* cited by examiner

```
        }
845    break;
       case HDR_REMOVE_EXIT_3:
          ee_flotation_header_operating_mode_nbl = HDR_NORMAL;
                                    // this will call Trim_switches_init() which will reload the ee values into the
          flotation_state_machine_init();
850    break;
       }
       break;
855
       /*******************************
            HEADER TRANSPORT MODE
       *******************************/
860    Oct 9, 2004 - Take this offline but keep in the source files for future reinstatement
       case HDR_TRANSPORT:
865       _inhibit_trim_adj_b0_uc = 1;                          // always disallow a Trim adjust
          switch( _transport_state_b0_ul )
          {
          default:
870       case TRANSPORT_INIT:
             _timer2_b0_ul = 0;                                 // clr the timer
             _transport_state_b0_ul = TRANSPORT_1;              // go to the next state
875       break;
          case TRANSPORT_1:   // FIRST GET THE ACCUMULATORS UP TO MAX
             HSD_hydr_master_on_b_xp = TRUE;
880          Header_lower_sol = 1;                              // turn solenoids B F on // Hit proportional valve with the transport float value
```

Fig. 5

```
                Flotation_left_desired_psi_b0_ul = TRANSPORT_PRESSURE_psi_b0_ul;
                Flotation_right_desired_psi_b0_ul = TRANSPORT_PRESSURE_psi_b0_ul;

885
        // longer period of time in case we came here from header remove mode
890     if( ++_timer2_b0_ul >= _time_b0_ul2scans_sec_f( 9.00 ) )      // if we're here for 9 seconds
        {
                _timer2_b0_ul = 0;                              // clr the timer
                _transport_state_b0_ul = TRANSPORT_2;           // go to the next state
        } break;

895     case TRANSPORT_2:   // OPEN THE ACCUMULATORS TO THE LIFT CYLINDER

HSD_hydr_master_on_b_xp = TRUE;
                Header_lower_sol = 1;                           // turn solenoids B F on
900             Header_float_sol = 1;                           // turn solenoids C G on // Hit proportional valve with the transport float value
                Flotation_left_desired_psi_b0_ul = TRANSPORT_PRESSURE_psi_b0_ul;
                Flotation_right_desired_psi_b0_ul = TRANSPORT_PRESSURE_psi_b0_ul;

905     if( ++_timer2_b0_ul >= _4sec )                          // if we're here for 2 seconds
        {
                HSD_hydr_master_on_b_xp = TRUE;
                _transport_state_b0_ul = TRANSPORT_3;           // go to the next state
        }

910     break;

case TRANSPORT_3:   // OPEN THE ACCUMULATORS TO THE LIFT CYLINDER

915             Header_float_sol = 1;                           // turn solenoids C G on // Hit proportional valve with the transport float value
                Flotation_left_desired_psi_b0_ul = TRANSPORT_PRESSURE_psi_b0_ul;
                Flotation_right_desired_psi_b0_ul = TRANSPORT_PRESSURE_psi_b0_ul;

920     break;
        }

// TEST FOR GOING BACK TO NORMAL MODE
```

*Fig. 6*

```
925  if( hdr_lower_debounced_bt                                    // header lower switch being pushed
        || _gnd_speed_x_ten < _5_MPH_IN_TENTHS                     // or less than 5 mph
        || !iomap_dlgin_swstate_S11_hl_gnd_speed.debounced         // or not in hi-speed
        || _hdr_emerg_stop_debounced                               // or hdr PTO is not off
930     )
        {
           ee_flotation_header_operating_mode_nbl = HDR_NORMAL;
           Flotation_state_reset_hdr_normal_state_machine();
935        _reset_hdr_remove_state_machine();
           _reset_hdr_transport_state_machine();
        }
        break;
940  */
     }

945  /******************************************************/
     static void _reset_header_operating_mode_state_machine( void )
     {
        ee_flotation_header_operating_mode_nbl = HDR_WAKEUP;
950  }

/******************************************************/
     static void _reset_hdr_remove_state_machine( void )
955  {
        _hdr_remove_state_b0_ui = HDR_REMOVE_INIT;
     }

960  /******************************************************/
     static void _set_hdr_remove_state_machine_when_waking_up_in_romove_mode( void )
     {
        _hdr_remove_state_b0_ui = HDR_REMOVE_CHECK_SWITCHES;
965  }
```

*Fig. 7*

METHOD AND APPARATUS TO PUT A WINDROWER HEADER IN THE TRANSPORT MODE UNDER SPECIFIED CONDITIONS

This application is a Continuation-In-Part of previously U.S. patent application Ser. No. 10/822,465, filed Apr. 12, 2004; which has issued as U.S. Pat. No. 7,168,226 and claims priority to U.S. Provisional Application No. 60/699,271, filed Jul. 14, 2005; and U.S. Provisional Application No. 60/699,548, filed Jul. 15, 2005.

TECHNICAL FIELD

The present invention relates to agricultural windrowers and, more particularly, to a method embodied in a software program for automatically controlling the hydraulics to put the header of a windrower into the transport mode under certain specific conditions.

BACKGROUND OF THE INVENTION

U.S. Pat. No. 6,901,729; U.S. patent application Ser. No. 10/822,465, filed Apr. 12, 2004; U.S. Provisional Application No. 60/699,271, filed Jul. 14, 2005; and U.S. Provisional Application No. 60/699,548, filed Jul. 15, 2005, are each incorporated herein by reference in its entirety.

The present invention relates generally to harvesting machines of the type that require flotation systems for permitting their headers to ride lightly up and over rises in the terrain during field operation, and particularly to a hydraulic header lift and flotation system for such a machine that will provide the dual functions of header lift and flotation.

Header flotation systems typically use extension springs, either hydraulically or manually adjusted, bell cranks and other linkages to provide the desired function. The structure generally requires numerous components and large extension springs, and it is quite difficult to develop the mechanical components required to float the broad range of header sizes available even requiring different tractors or frames having their own flotation systems designed to meet their own particular header weight requirements.

Some manufacturers are using an accumulator and hydraulic cylinders to perform the flotation function. These machines typically use separate hydraulic cylinders for the lift and flotation functions, and they lack the capability of independently adjusting the flotation force for each side of the header. Additionally, some headers are not inherently balanced side to side. Special considerations must be made to float and lift these headers evenly by adding ballast, which can become unreasonably heavy or awkward, or modifying the lift geometry of one side.

It would be quite beneficial to have a header lift and flotation system that employs a single hydraulic cylinder for each side of the header, simplifying the controls and mechanical components necessary to perform these functions. It would also be beneficial to have an automatic capability for controlling the hydraulics to put the header of a windrower into a raised transport mode under certain specific conditions.

SUMMARY OF THE DISCLOSURE

Accordingly, it is an object of the present invention is to provide a hydraulic lift and flotation system for the header of a crop harvesting machine that employs a single hydraulic cylinder for each side of the header.

Another object of the present invention is to provide a hydraulic lift and flotation system to be used with both heavy and light headers/conditioners, i.e., a broad range of header sizes and weights.

It is another object of the instant invention to provide a more simplified structure that presents greater flexibility in locating the accumulator as opposed to extension springs and necessary linkages, with fewer pivot points to wear and fewer parts to manufacture and assemble.

It is still another object of the instant invention to provide a flotation and lift system that requires no dealer or customer assembly.

It is an even still further object of the instant invention to provide a hydraulic header flotation and lift system that reduces hydraulic and mechanical shock loading when raising the header in a less than fully raised position, improving the ride comfort for the operator and improving hydraulic and structural durability of the harvester.

It is yet another object of this invention to provide an improved hydraulic header lift and flotation system that is durable in construction, inexpensive of manufacture, carefree of maintenance, facile in assemblage, and simple and effective in use.

It is still yet another object of this invention to have an automatic capability for controlling the hydraulics to put the header of a windrower into a raised transport mode under certain specific conditions. Another object is to have a capability to automatically put the header in a float mode when in the transport mode. And, another object is to have a capability to return the header to a normal mode when normal mode criteria are present.

These and other objects are attained by providing a hydraulic lift/flotation system for the header of a crop harvesting machine. Each side of the header is supported by a single cylinder that performs both the flotation and lift functions. To accommodate unbalanced headers (center of gravity not centered between the lift arms), hydraulic oil is sent to the return side of the lift cylinder on the lighter side of the header, thus resulting in even raising, lowering and float.

Specific conditions for automatic movement of the header to the transport mode can include, but are not limited to, the machine being in a high speed range; the header not operating; a ground speed of the machine above a predetermined level; and a last control command being a header raise command.

BRIEF DESCRIPTION OF THE DRAWINGS

The advantages of this invention will be apparent upon consideration of the following detailed disclosure of the invention, especially when taken in conjunction with the accompanying drawings wherein:

FIG. 5 is a written listing of steps of the preferred program of the invention;

FIG. 6 is a written listing of further steps of the preferred program of the invention;

FIG. 7 is a written listing of still further steps of the preferred program of the invention.

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
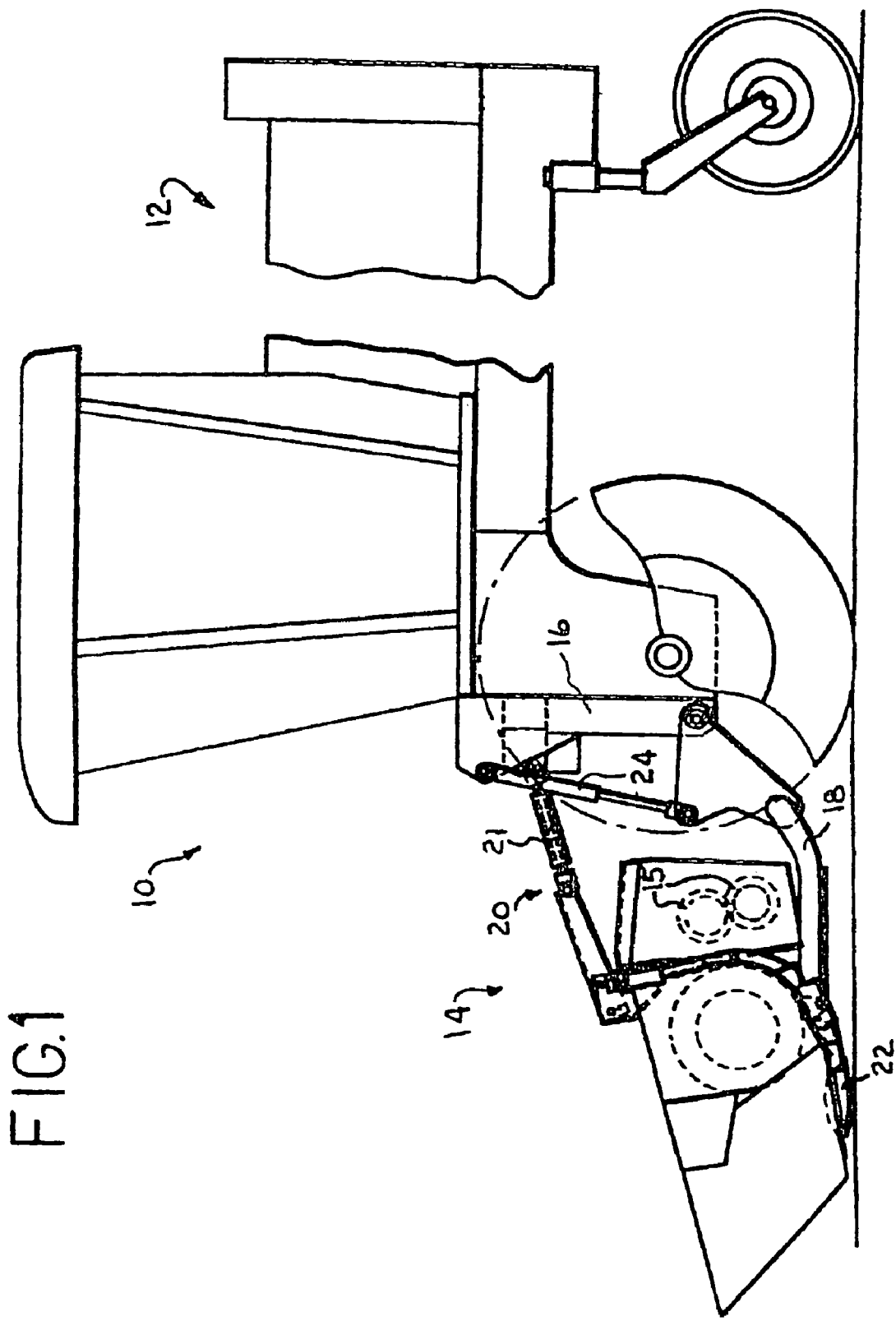
FIG. 1 is a partial side elevational view of a crop harvesting machine of the type with which the invention may be used, also showing a simplified side view of the lift and flotation system of the instant invention.

FIG. 1 shows the present invention utilized in connection with a self-propelled windrower 10; however, it will be appreciated that the principles of the present invention are not limited to a self-propelled windrower, or to any specific type of harvesting machine.

In the illustrated embodiment, the self-propelled windrower 10 comprises a tractor 12 and a header 14, the header 14 being attached to the front end of the frame 16 or chassis of the tractor 12. The header may be of generally any suitable construction and design, and may include not only crop-harvesting mechanisms, but also crop conditioners such as elongate rolls 15. Such attachment of the header 14 to the frame 16 is achieved through a pair of lower arms 18 (only the left one being shown, the right being generally the same) pivoted at one end to the frame 16 and at the other end to the header 14, as well as through a central upper link 20. The link 20 may take the form of a single double-acting hydraulic cylinder 21 whose extension and retraction is controlled by the operator to remotely control the angle of sickle bar 22 on the lower front of the header 14.

A single lift/flotation cylinder 24 or 26, interconnecting the lower arm 18 and the frame 16 supports each side of the header, i.e., each side of the header is supported by its own lift/flotation cylinder 24 or 26, respectively (again, only the left one being shown in this FIG. 1).

More specifically, the control system accomplishes two generally separate control functions, one for the left side lift/flotation cylinder 24 and one for the right side lift/floatation cylinder 26.

Figure 2:
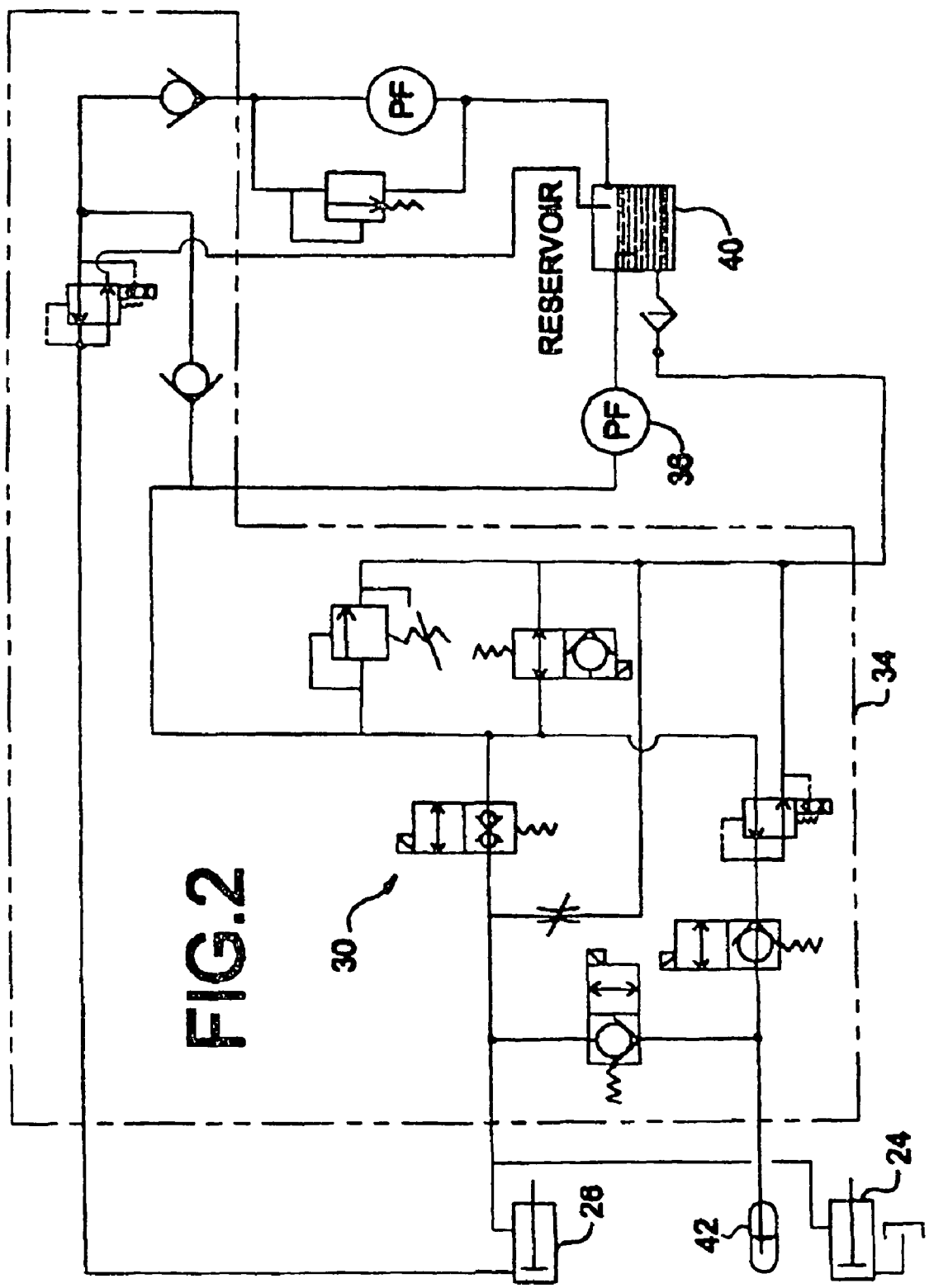
FIG. 2 is a hydraulic schematic view of one embodiment of the hydraulic system of the instant invention.

Directing attention now to FIG. 2, the hydraulic control system for left cylinder 24 and right cylinder 26 can be seen to include an electro-hydraulic subsystem generally depicted as 30. For convenience of assembly and operation, the majority of the components are housed in a single valve body 34 with appropriately located ports and other necessary connection devices and fixtures. A fixed displacement pump 36 moves the hydraulic fluid into subsystem 30 from reservoir 40, through the various circuits as directed by control valves, to a single accumulator 42, to hydraulic cylinders 24, 26 and back to reservoir 40 as appropriate.

Figure 3:
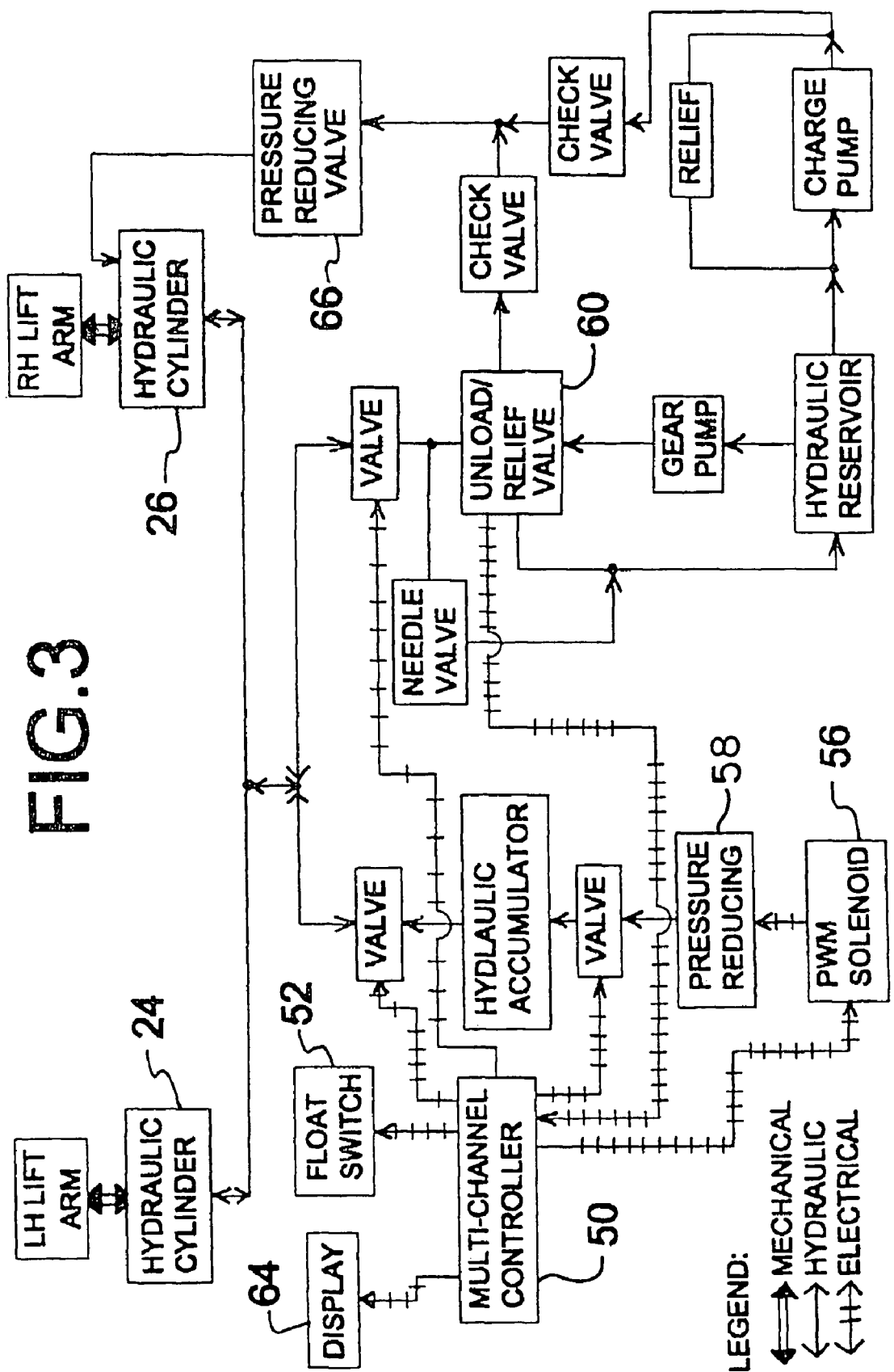
FIG. 3 is a schematic of the hydraulic, mechanical and electrical sub-systems that cooperate to produce the system of FIGS. 1 and 2.

FIG. 3 provides a more detailed depiction of the complete control system and subsystems. The hydraulic system, as shown also in FIG. 2, additionally depicts the electrical control and mechanical subsystems. Importantly, this figure depicts the multi-channel programmable controller 50 which exchanges electrical signals from the float switch 52, the PWM (pulse width modulated) solenoid 56, the proportional pressure reducing valve, PPRV or PRV 58, the unload/relief valve 60, and other valves to manage the lift and flotation functions as established by the operator through the appropriate switch and shown on display 64. PRV 58 controls the amount of flotation pressure, as set by the operator. PRV 58 is current controlled/regulated. Controller 50 is preferably of the type known as a micro-controller or embedded controller unit.

The hydraulic cylinders, attached to respective ends of the header, perform both the lift and flotation functions. The lifting and floating function is achieved by coupling the lifting end of the hydraulic cylinders to each other and then to a hydraulic pump, control manifold, and accumulator. The operator sets the desired flotation force by actuating a rocker switch located on the operator's console. One switch position allows hydraulic oil to enter the accumulator (increasing the hydraulic pressure), which reduces the header contact force, or flotation force, with the ground. The other switch position allows oil to exit the accumulator (reducing the hydraulic pressure), which increases the header contact force with the ground. Once the flotation force is set, the control valves will return to this preset flotation condition whenever the float mode is selected, irrespective of subsequent header lift and lower operations.

To accommodate unbalanced headers (the header center of gravity is not centered between the lift arms), hydraulic oil is applied to the return side of the lift cylinder on the lighter side of the header. The addition of a defined hydraulic pressure on the back side of the cylinder results in the same lifting pressure to be required for each side. The header will then raise, lower, and float evenly. The result is the same as changing the lift geometry or adding ballast to the header. This function is referred to as the "hydraulic counterweight".

The hydraulic oil is supplied from the hydraulic ground drive charge pump, which provides constant pressure any time the engine is running. To prevent cavitation of the charge pump during rapid changes in system volume, such as during the header lower cycle, makeup oil is supplied from the header lift pump. The operator sets the hydraulic counterweight by turning a manual control valve 66 to apply more weight (hydraulic pressure) to the light side of the header until the header raises and lowers to a level condition. If too much weight is applied, the operator simply turns the valve in the opposite direction. Once the correct setting is established, the hydraulic counterweight will not need to be readjusted during machine operation. Re-adjustment will only become necessary if the header builds up with debris or upon exchange with another header.

For headers that experience severe changes in balance during normal operation, i.e., draper headers with deck-shift, an electro-hydraulic valve can be installed in place of the manual control valve. This electro-hydraulic valve is adjusted from a rocker switch on the operator's console. The operator then sets the hydraulic counterweight for each deck position. Once these values are established, the control valve will adjust automatically as the deck positions are selected.

This disclosure describes a header flotation system that is referred to as "non-independent". While other embodiments are possible, including an independent system (see the disclosure of patent application Ser. No. 10/822,465 incorporated herein in its entirety by reference) it is the non-independent embodiment that provides the best example of the type of system with which the program of the instant invention can/should be used.

Figure 4:
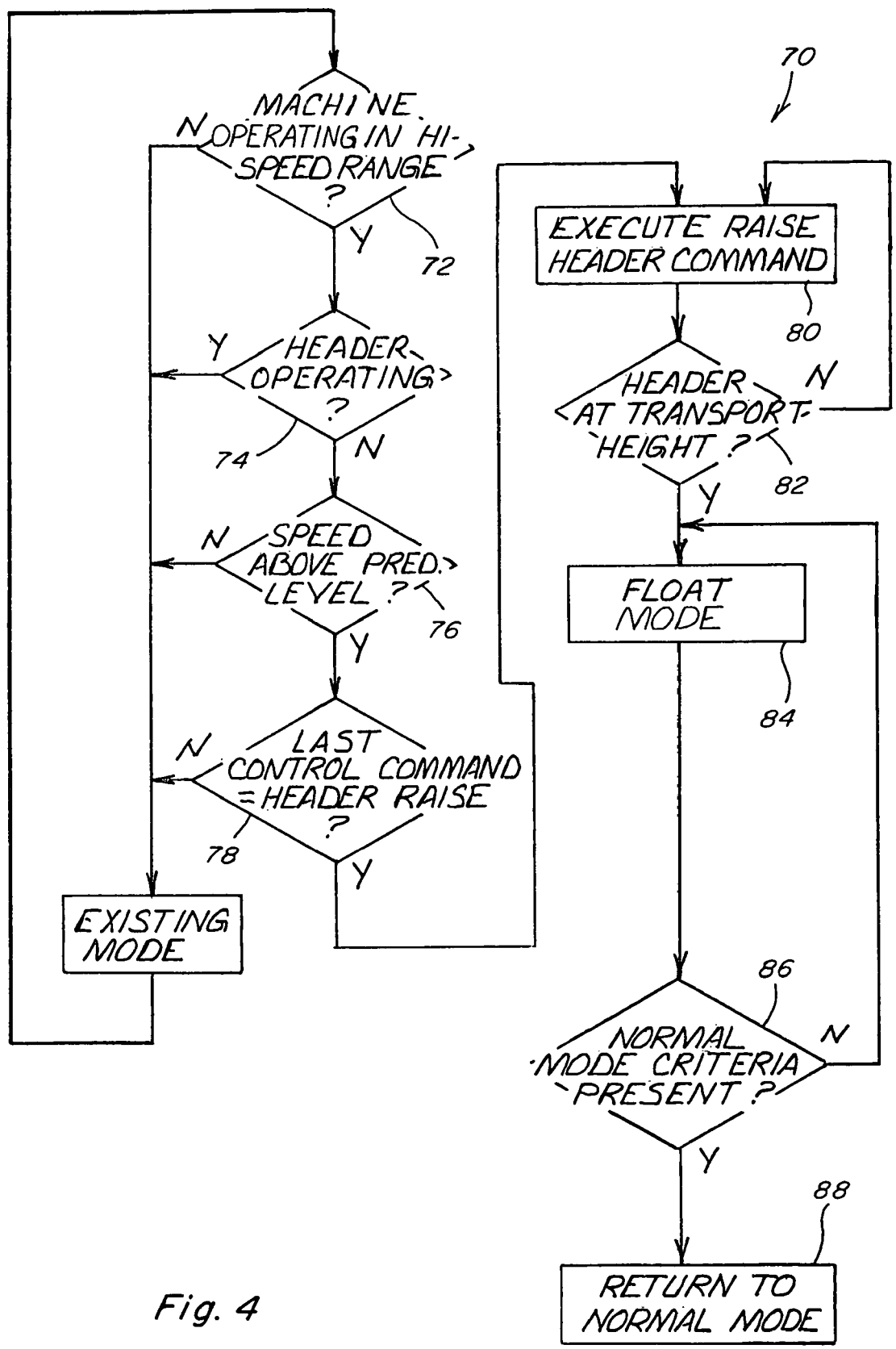
FIG. 4 is a high level flow diagram illustrating steps of a preferred computer program for controlling the lift and flotation system for raising a header of the crop harvesting machine from a lowered position such as illustrated in FIG. 1, to an elevated transport position, according to the invention.
Figure 8:
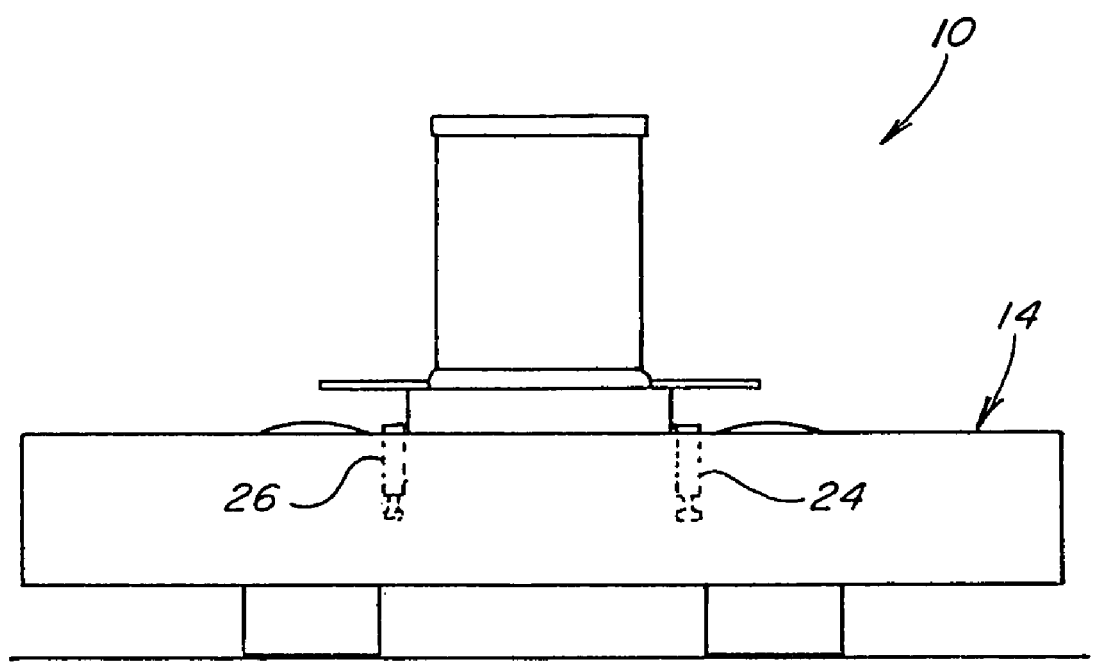
FIG. 8 is a simplified front view of the machine of FIG. 1 with the header thereof raised to the transport position by the program according to the instant invention.

Directing attention to FIG. 4, a high level flow diagram 70 is shown illustrating steps of a preferred embodiment of the computer program for controlling the lift and flotation system for raising a header of the crop harvesting machine from a lowered position such as illustrated in FIG. 1, to an elevated transport position, as illustrated in FIG. 8, according to the instant invention. The program is used to promote improved operator and machine safety in an existing system. To promote this safety, automatically raising the header to the transport mode/position is used with the current machine. As illustrated in the flow diagram 70, the header will automatically raise to the transport position (weight supported on the accumulators or accumulator 42) when certain criteria is met, i.e., when the machine is moving in the high speed range, as determined at decision block 72; the header is not operating, as determined at decision block 74; the machine speed is above a predetermined a level, for instance, 10 mph, as determined at decision block 76; and the last control command or push was "header raise", as determined at the decision block 78. The accumulator or accumulators can be switched in for operation in the float mode, as denoted at block 84, after transport height is reached or the header can be raised through the PRV circuit (PRV 58), such as illustrated by block 80 and decision block 82, thereby always using the accumulator or accumulators during the raising process. The header can be raised fully against the upper stop or held slightly away to allow cushioning in both directions. If held slightly away from, that is, below the upper stop, the header will be allowed to rise up by the slight amount. Normal mode, as denoted at block 88, is automatically re-established from the transport mode when certain criteria is met or present, as determined at decision block 86. Exemplary criteria are set forth in the program, as discussed below.

Referring also to FIGS. 5, 6 and 7 (see generally lines 860-940), a written listing of steps of the preferred program of the invention for raising the header to the transport position (block 80 of FIG. 4), once the determinations of decision blocks 72, 74, 76 and 78 of FIG. 4 are made. The notes on the program provide a very good explanation of the various line items and steps making up the program. The program steps are written to accommodate an independent system, but are applicable to the non-independent system of FIG. 2, and therefore that figure can be referred to when reading the program steps. More particularly, referring generally to lines 875-890, first the pressure in the accumulator or accumulators is raised to maximum. This involves turning on solenoid B (FIG. 2) to connect accumulator 42 with the pressurized hydraulic fluid condition regulated by PRV 58. In an independent system utilizing two accumulators, this would also entail turning on a second, parallel solenoid for the other independent circuit, denoted in the program as solenoid F. PRV 58 would be programmed with a transport float pressure value. As a result, hydraulic oil from pump 36 would be directed as required through PRV 58 and the valve controlled by solenoid B to accumulator 42, such that accumulator 42 would be pressurized to the transport float pressure value. Accumulator 42 would then be connected in fluid communication with lift/flotation cylinders 24 and 26, by turning on solenoid C. If the system is independent, a corresponding solenoid denoted as solenoid G in the program, would be turned on, to connect the accumulator of the other independent circuit to the other respective cylinder, as indicated generally in lines 895-920.

The controller will then loop through blocks 84 and 86 of FIG. 4, testing for the criteria for returning to the normal mode, as denoted generally by lines 920-925. Such criteria can include, but are not limited to, a header lower switch being pushed; a machine speed of less than 5 mph; the machine is operated in a speed range other than the high-speed range; or the header PTO is not off. Presence of any one of these criteria can cause the program to return to the normal operating state.

FIG. 8 illustrates header 14 of machine 10 raised to the transport height by cylinders 24 and 26.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. A method for operating a system on an agricultural harvesting machine operable for controlling a vertical position of a header of the machine relative to a frame thereof, comprising a step of:
   automatically raising the header to a predetermined elevated transport position, when at least the following conditions are present:
   the machine having at least two operating ranges including a high speed range and at least one lower speed operating range is traveling in a first direction and operating in the high speed range; and a speed of the machine is above a predetermined level.

2. The method of claim 1, comprising a further step of automatically operating the system in a float mode when the header is in the elevated transport position such that at least one cylinder controlling the positioning of the header is placed in fluid communication with an accumulator.

3. The method of claim 2, comprising a further step of automatically changing the operating mode of the system from the float mode to a normal mode wherein the at least one cylinder is removed from fluid communication with the accumulator responsive to presence of either of the following conditions:
   the machine is no longer operating in the high-speed range; and
   the speed of the machine falls below the predetermined level.

4. The method of claim 1, wherein the conditions required for the automatic raising of the header to the elevated transport position further include a header power take-off is not operating.

5. The method of claim 1, wherein the conditions required for the automatic raising of the header to the elevated transport position further include a last operator inputted control command being a header raise command.

6. The method of claim 1, wherein the predetermined level of the speed of the machine is about 10 mph.

7. A method for automatically raising a header of an agricultural harvesting machine to an elevated transport position, comprising steps of:

providing a header lift and flotation system interconnecting the header and a frame of the machine, and operable for selectably raising and lowering the header relative to the frame;

providing a programmable controller in operative control of the header lift and flotation system; and wherein the controller is programmed to automatically raise the header to the elevated transport position, when at least the following conditions are present:

the machine, having at least at least two operating ranges including a high speed range and at least one lower speed operating range, is traveling in a first direction and is operating in the high speed range; and a speed of the machine is above a predetermined level.

8. The method of claim 7, comprising a further step of the controller being programmed for automatically operating the system in a float mode when the header is in the elevated transport position such that at least one cylinder controlling the positioning of the header is placed in fluid communication with an accumulator.

9. The method of claim 8, comprising a further step of the controller being programmed for automatically changing the operating mode of the system from the float mode to a normal mode, wherein in the normal mode the at least one cylinder is removed from fluid communication with the accumulator, responsive to presence of either of the following conditions:

the machine is no longer operating in the high-speed range; and the speed of the machine falls below the predetermined level.

10. The method of claim 7, wherein the conditions required for the automatic raising of the header to the elevated transport position further include the header not being powered by the vehicle.

11. The method of claim 7, wherein the conditions required for the automatic raising of the header to the elevated transport position further include a last operator inputted control command being a header raise command.

12. The method of claim 7, wherein the predetermined level of the speed of the machine is about 10 mph.

13. A method for automatically raising a header of an agricultural harvesting machine to an elevated transport position, comprising steps of:

providing a header lift and flotation system interconnecting the header and a frame of the machine, and operable for selectably raising and lowering the header relative to the frame;

providing a programmable controller in operative control of the header lift and flotation system; and wherein the controller is programmed so as to automatically raise the header to the elevated transport position, when at least the following conditions are present:

the machine is operating in a high speed range;

a speed of the machine is above a predetermined level;

the header is not operating; and a last operator inputted control command is a header raise command; and wherein the controller is programmed to automatically operate the system in a float mode when a header is raised to the transport position.

14. The method of claim 13, comprising a further step of the controller being programmed for automatically changing the operating mode of the system from the float mode to a normal mode, wherein in the normal mode the at least one cylinder is removed from fluid communication with the accumulator, responsive to presence of either of the following conditions:

the machine is no longer operating in the high-speed range; and the speed of the machine falls below the predetermined level.

15. The method of claim 13, wherein the predetermined level of the speed of the machine is about 10 mph.

16. An agricultural harvesting machine, comprising:

a frame;

a header lift and flotation system interconnecting the header and the frame, and operable for selectably raising and lowering the header relative to the frame;

a programmable controller in operative control of the header lift and flotation system; and wherein the controller is programmed to automatically raise the header to the elevated transport position and place the header in a header float mode such that the hydraulic circuit and at least one cylinder controlling the positioning of the header is placed in fluid communication with an accumulator, when at least the following conditions are present:

the machine, having at least at least two operating settings including a high speed travel setting and at least one lower speed travel setting, is traveling in a first direction and operating in the high speed; and a speed of the machine is above a predetermined level.

17. The harvesting machine of claim 16, wherein the controller is programmed for automatically operating the system in the float mode when the header is in the elevated transport position, the controller configured in float mode to adjust a pressure reducing valve within a hydraulic circuit of the header to raise the pressure in the at least one accumulator, the pressure reducing valve having a transport float pressure value, wherein in float mode the fluid is directed through the pressure reducing valve to the accumulator, such that the accumulator is pressurized to the transport float pressure value and then placing the accumulator in fluid communication with at least one header height cylinder.

18. The harvesting machine of claim 16, wherein the controller is programmed for automatically changing the operating mode of the system from the float mode to a normal mode, wherein in the normal mode the at least one cylinder is removed from fluid communication with the accumulator such that the at least one cylinder is maintained generally rigid, responsive to presence of either of the following conditions:

the machine is no longer operating in the high-speed travel setting; and the speed of the machine falls below the predetermined level.

19. The harvesting machine of claim 16, wherein the conditions required for the automatic raising of the header to the elevated transport position further include a header power take-off is not operating.

20. The harvesting machine of claim 16, wherein the conditions required for the automatic raising of the header to the elevated transport position further include a last operator inputted control command being a header raise command.

21. The harvesting machine of claim 16, wherein the predetermined level of the speed of the machine is about 10 mph.

22. The harvesting machine of claim 16, wherein the machine is a windrower.

23. A method for operating a system on an agricultural harvesting machine operable for controlling a vertical position of a header of the machine relative to a frame thereof, comprising a step of:

automatically raising the header to a predetermined elevated transport position, when at least the following conditions are present:

the machine having a higher speed range and at least one lower speed range of operation is operating in the high speed range; and a header power take-off is not operating.

24. The method of claim 23, comprising a further step of automatically operating the system in a float mode when the header is in the elevated transport position, such that at least one cylinder controlling the positioning of the header is placed in fluid communication with an accumulator.

25. The method of claim 24, comprising a further step of automatically changing the operating mode of the system from the float mode to a normal mode, wherein in the normal mode the at least one cylinder is removed from fluid communication with the accumulator, responsive to presence of either of the following conditions:

the machine is no longer operating in the high-speed range; and the speed of the machine falls below a predetermined level.

26. The method of claim 23, wherein the conditions required for the automatic raising of the header to the elevated transport position further include the machine operating at a speed of about 10 m.p.h.

27. The method of claim 23, wherein the conditions required for the automatic raising of the header to the elevated transport position further include a last operator inputted control command being a header raise command.

* * * * *